United States Patent [19]
Tange

[11] Patent Number: 5,908,606
[45] Date of Patent: Jun. 1, 1999

[54] METHOD FOR PRODUCING HYDROGEN HALIDE AND OXYGEN

[75] Inventor: Kyoichi Tange, Mishima, Japan

[73] Assignee: Toyota Jidosha Kabushiki Kaisha, Japan

[21] Appl. No.: 09/151,723

[22] Filed: Sep. 11, 1998

[30]       Foreign Application Priority Data

Sep. 12, 1997   [JP]   Japan ..................................... 9-248991

[51] Int. Cl.$^6$ ............................. C01B 7/01; C01B 7/19; C01B 7/09; C01B 7/13
[52] U.S. Cl. ......................... 423/481; 423/483; 423/486; 423/579
[58] Field of Search ................... 423/481, 486, 423/484, 579, 483

[56]                  References Cited

U.S. PATENT DOCUMENTS

| | | | |
|---|---|---|---|
| 805,009 | 11/1905 | Everette | 423/486 |
| 1,485,816 | 3/1924 | Rosenstein | 423/486 |
| 1,843,354 | 2/1932 | Behrman | 423/481 |
| 1,870,308 | 8/1932 | Behrman | 423/486 |
| 2,238,896 | 4/1941 | Gibbons | 423/486 |
| 5,322,674 | 6/1994 | Mori | 423/481 |
| 5,709,791 | 1/1998 | Hibino | 423/483 |

FOREIGN PATENT DOCUMENTS

| | | |
|---|---|---|
| 8-301606 | 11/1996 | Japan . |
| 606810 | 5/1978 | U.S.S.R. ................................ 423/579 |

OTHER PUBLICATIONS

Gibbs, H. D., "The Production of Hydrochloric Acid From Chlorine and Water", Journal of Industrial & Engineering Chemistry, vol. 12, No. 6, pp. 538–541, Jun. 1920.

Hirschkind, W., "Manufacture of Hydrochloric Acid From Chlorine", Industrial and Engineering Chemistry, vol. 17, No. 10, pp. 1071–1073, Oct. 1925.

*Primary Examiner*—Ngoc-Yen Nguyen
*Attorney, Agent, or Firm*—Finnegan, Henderson, Farabow, Garrett & Dunner, L.L.P.

[57]            ABSTRACT

The present invention provides a process for producing hydrogen halide and oxygen by a stable chemical reaction for a long time. In this method, hydrogen halide and oxygen are produced by reacting water and halogen as represented with the following formula:

$$H_2O + X_2 \rightarrow 2HX + \tfrac{1}{2}O_2 \tag{1}$$

(wherein, X represents a halogen), wherein porous silica having a mean pore diameter of 0.7 to 5 nm is used as catalyst. Preferably, hydrophilic functional groups are provided on the surface of said porous silica.

3 Claims, 2 Drawing Sheets

(c)

(b)

ATMA (a)

METHOD FOR PRODUCING HYDROGEN HALIDE AND OXYGEN

BACKGROUND OF THE INVENTION

1. Field of the Invention

The present invention relates to a method for producing hydrogen halide and oxygen and, more particularly, the present invention relates to a method for producing hydrogen halide and oxygen comprising chemically reacting water and a halogen using porous silica as a catalyst.

2. Description of the Related Art

Because hydrogen and oxygen are attracting attention as clean sources of energy, a method by which water is broken down electrochemically has been established for their production on an industrial scale. However, this method has problems in terms of cost since it requires a large amount of electrical power. In order to solve this problem, a method has been proposed for chemically decomposing water.

Namely, water is reacted with halogen to form hydrogen halide and oxygen after which the hydrogen halide is electrically decomposed to form hydrogen. According to this method, since oxygen is obtained by a chemical reaction and hydrogen is obtained at a much lower voltage as a result of electrically decomposing hydrogen halide instead of electrically decomposing water directly, it offers the advantage of being able to reduce the amount of electrical energy required.

However, in this type of method, since carbon granules are introduced in the reaction of halogen and water, these carbon granules react with oxygen formed by the reaction in the form of a side reaction resulting in the formation of carbon dioxide. Thus, this method had the problem of low reaction efficiency as a result of the carbon granules being consumed. In order to solve this problem, the inventors of the present invention have previously proposed the use of activated carbon as catalyst in place of carbon granules in the above-mentioned reaction system (Japanese Unexamined Patent Publication No. 8-301606). As a result of using this activated carbon, reaction with oxygen is inhibited, thereby making it possible to increase the reaction efficiency.

Since activated carbon reacts less with oxygen than carbon granules, and although reaction efficiency could be improved by using activated carbon as catalyst in the reaction system of water and halogen, activated carbon still reacted to a certain extent with oxygen, thus preventing this reaction from being completely inhibited. Therefore, the inventors of the present invention searched for a catalyst that did not result in the occurrence of this type of side reaction, thereby leading to completion of the present invention.

SUMMARY OF THE INVENTION

In order to solve the above-mentioned problems, the present invention provides a method for producing hydrogen halide and oxygen by reacting water and halogen as represented with the following formula:

$$H_2O + X_2 \rightarrow 2HX + \tfrac{1}{2}O_2 \tag{1}$$

(wherein, X represents a halogen), wherein porous silica having a mean pore diameter of 0.7 to 5 nm is used as catalyst. Preferably, hydrophilic functional groups are provided on the surface of said porous silica.

DETAILED DESCRIPTION OF THE PREFERRED EMBODIMENTS

Figure 1:
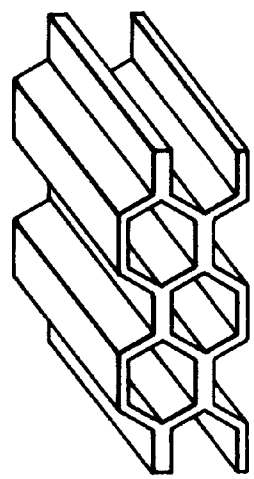
FIG. 1 is a sketch of the production process of the silica used in the present invention. (a) is the kanemite sheet used as the raw material, (b) is the complex of kanemite and alkylmethylammonium (ATMA) formed by heating kanemite in ATMA, and (c) is porous silica having hexagonal pores that is formed by interlayer cross-linking of kanemite.
Figure 1:
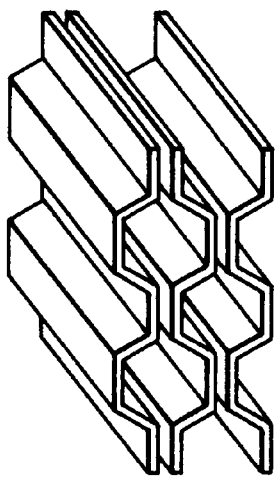
Figure 1:
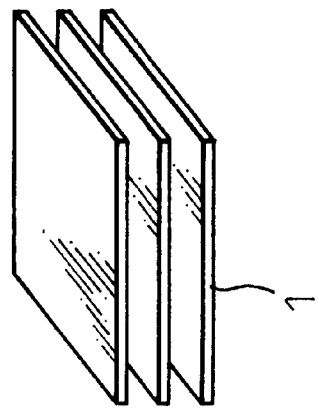

As represented by the above-mentioned formula (1), the present invention produces hydrogen halide and oxygen by chemically reacting water and halogen. As represented by the following formulas:

$$H_2O + X_2 \rightarrow HX + HXO \tag{2}$$

$$HXO \rightarrow HX + \tfrac{1}{2}O_2 \tag{3}$$

in this reaction, water and halogen first react resulting in the formation of hydrogen halide HX and hypohalogenous acid HXO after which the reaction reaches equilibrium (formula (2)). Moreover, hypohalogenous acid decomposes to halogen hydride and oxygen by a self-decomposition reaction (formula (3)). Thus, the above reaction is believed to proceed in two stages.

However, even if a halogen aqueous solution itself is given energy in the form of heat or light and so forth, the above reaction does not occur, and it is necessary to add a catalyst in order to carry out the reaction. In the case of using carbon granules as catalyst, oxygen produced by the reaction is adsorbed onto the surface of the carbon granules, and ends up changing to $CO_2$ as represented by:

$$C + O_2 \rightarrow CO_2 \tag{4}$$

In order to solve this problem, the inventors first used activated carbon instead of carbon granules and then maintained reaction efficiency by inhibiting the reaction of the above-mentioned formula (4) by making the surface of the activated carbon hydrophobic and removing $O_2$ from the reaction system, etc.

However, it was difficult to completely inhibit the above-mentioned reaction of formula (4) even if activated carbon was used in this manner. Moreover, in order to promote industrial application of this reaction, it was necessary to increase the reaction rates of the reaction represented by the above-mentioned formulas (2) and (3). In this case, however, this also resulted in the promotion of the reaction of formula (4), thereby creating an obstacle to its practical application.

Therefore, the inventors of the present invention conducted various searches for a material that could be used as catalyst in place of activated carbon. Namely, 5 g of various catalysts were added to an aqueous solution of 1 M $Br_2$ and 1 M $ZnBr_2$ and reacted for 10 hours at 25° C. The amount of oxygen formed was then measured to investigate the potential for use of each catalyst. The reason why $ZnBr_2$ was added was that, although $Br_2$ itself only dissolves on the order of 3.58 g in 100 g of water (20° C., 1 atm), the addition of $ZnBr_2$ promotes the reaction of $Br_2 + Br^- \rightarrow Br_3^-$, and this $Br_3^-$ ion can be dissolved in water. As a result, as shown in Table 1, it was found that a phenomenon was obtained in which oxygen was formed as a result of catalyzing the reaction of water and halogen in the same manner as in the case of using activated carbon.

TABLE 1

|  | No Catalyst | Activated Carbon | Molecular Sieves | Silica Gel | Zeolite |
|---|---|---|---|---|---|
| Amount of Oxygen (mM) | 0 | 70 | 4 | 5 | 2 |

Zeolite is a substance that has silica as a base and contains alumina. This alumina is not suited for use because it reacts with halogen and this reaction causes its structure to break down. On the other hand, since silica gel and molecular sieves do not react with halogen or oxygen, they were considered to have a high potential for use as catalyst in the present invention. Thus, pure silica is suited for use as a catalyst.

In this manner, although it is believed that the use of silica as catalyst allows water and halogen to react without catalyst deterioration, according to the results of Table 1, the amount of oxygen generated is less than the case of using activated carbon as catalyst, but cannot be said to be adequate. This was thought to be due the random sizes of the pores in the silica gel molecular and molecular sieves used as catalyst.

In the case of using a porous substance in the form of silica as a catalyst, halogen exists in the atomic state in the silica pores and is believed to react with water there. Namely, the silica pores are considered to function as the reaction site of water and halogen, and in order to promote the reaction of water and halogen, it is necessary that halogen be trapped in those pores. However, the size of halogen molecules is about 7 Å at its narrowest portion. Thus, if the size of the pores is 7 Å or less, halogen cannot enter the pores and cannot be trapped. In addition, if the pore size is too large, the halogen ends up escaping from the pores and is not trapped. Thus, it is necessary for the pore size of the silica to be within a predetermined range in order for it to effectively function as a catalyst.

In order to investigate the relationship between silica pore size and catalyst activity, we first prepared silica of differing pore diameters within the range of 0.5 to 10 nm. This silica having different pore diameters can be prepared, for example, as shown in FIG. 1. To begin with, kanemite ($NaHSi_2O_3$ $3H_2O$) is used for the raw material. This kanemite (1) is composed of monolayer silicate sheet having sodium ions between the layers, and can be synthesized easily by baking a crystalline sodium silicate at 700° C. and immersing in water. The plurality of kanemite sheets are heated after being placed in an aqueous solution of a surface activator in the form of alkylmethylammonium (ATMA) (FIG. 1a). When this was done, in addition to the ATMA entering between the layers of kanemite by ion exchange, the kanemite sheet bends to form a complex with ATMA (FIG. 1b). Next, the surface activator is removed, and the layers of kanemite are cross-linked by dehydration condensation of the silanol groups, resulting in the formation of a stable, three-dimensional skeleton in which hexagonal pores are formed (FIG. 1c). The diameter of the formed pores can be controlled by varying the alkyl chain length of the surface activator used during formation of the ATMA kanemite complex. Namely, the use of a surface activator having a long chain length allows the formation of larger pores.

Figure 2:
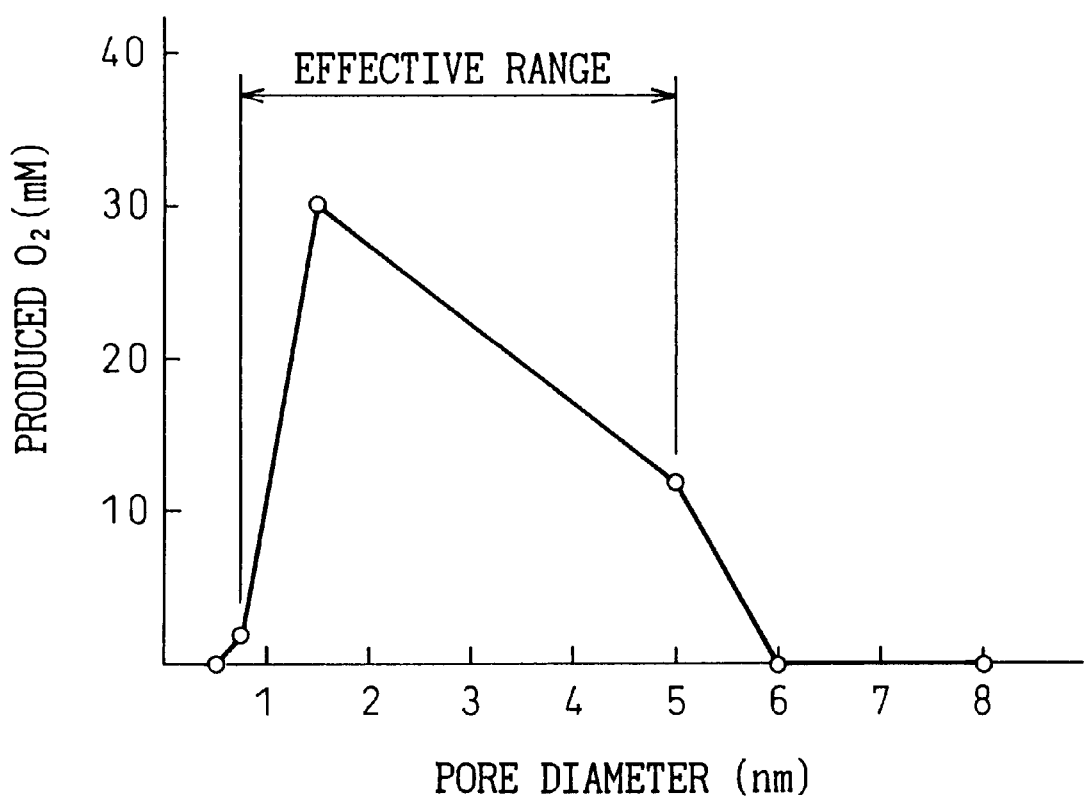
FIG. 2 is a graph showing the relationship between the pore diameter of the silica used and the amount of oxygen formed.

Using the silica sheets having different pore diameters produced in this manner, the amount of oxygen formed was measured in the same way as mentioned above. Those results are shown in FIG. 2. In the case of using silica having a pore diameter of 0.5 nm (5 Å) or less, the reaction between halogen and water did not occur and oxygen was not formed. This is thought to be due the size of Br molecules being such that lattice constant a=4.48 Å, b=6.67 Å and c=8.72 Å, thus preventing $Br_2$ from entering pores having a diameter of 0.5 nm (5 Å) or less. Since the molecular size of iodine molecules is such that lattice constant a=4.18 Å, b=7.25 Å and c=9.77 Å, exhibiting a size that is similar to that of bromine molecules, similar results would be obtained. In addition, oxygen was also not generated when the pore diameter is 6 nm or more. The above results indicated that the pore diameter of the silica must be within the range of 0.7 to 5 nm.

In addition, MCM-41 developed by Mobile is known as a porous silica material. When the reaction between halogen and water was carried out in the same manner as described above using MCM-41 having a pore diameter of 5 nm, 18 mM of oxygen were generated. This amount is greater than the result of using silica having the same pore diameter of 5 nm shown in FIG. 1 (amount of oxygen generated: 12 mM), thereby indicating MCM-41 to be superior. However, since the structural stability of MCM-41 at temperatures of about 60–70° C. is low and the reaction rate is increased, it cannot be used at high temperatures.

As a result of examining the cause of this MCM-41 yielding superior results, it was determined that there are differences in the hydrophilic nature on its surface. Therefore, it was attempted to perform hydrophilic treatment on the surface of the porous silica prepared in the manner described above. Namely, after temporarily adsorbing steam onto the porous silica, the surface of the silica was given hydrophilic groups by then eliminating the steam. When this silica (pore diameter: 5 nm) was used in the reaction of water and halogen in the same manner as described above, 25 mM of oxygen were obtained. The provision of COOH groups, OH groups and so forth on the surface can be considered for this hydrophilic treatment.

As has been described above, by reacting water and halogen using porous silica having a mean pore diameter of 0.7 to 5 nm as catalyst, oxygen and hydrogen halide can be produced by chemical reaction in a stable manner for a long time without deterioration of the catalyst. Hydrogen can then easily be obtained from the resulting hydrogen halide. In addition, by providing this silica with hydrophilic groups, the catalyst efficiency can be further increased.

I claim:

1. A method for producing hydrogen halide and oxygen by reacting water and halogen as represented with the following formula:

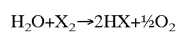

$$H_2O + X_2 \rightarrow 2HX + \tfrac{1}{2}O_2$$

wherein X represents a halogen, wherein porous silica having a mean pore diameter of 0.7 to 5 nm is used as catalyst.

2. The method as set forth in claim 1 wherein said porous silica has hydrophilic functional groups on its surface.

3. The method as set forth in claim 2 wherein said hydrophilic functional groups are —COOH groups or —OH groups.

* * * * *